United States Patent [19]

Kasai et al.

[11] 4,447,880
[45] May 8, 1984

[54] SYSTEM FOR DETECTING THE TRANSIENT STATE OF ENGINE OPERATION

[75] Inventors: Yoshiaki Kasai, Kiyose; Masaaki Ohgami, Musashino, both of Japan

[73] Assignees: Fuji Jukogyo Kabushiki Kaisha, Tokyo; Nissan Motor Co., Ltd., Yokohama, both of Japan

[21] Appl. No.: 223,677

[22] Filed: Jan. 9, 1981

[30] Foreign Application Priority Data

Jan. 16, 1980 [JP] Japan ................................. 55-3176

[51] Int. Cl.³ .................... F02P 5/04; G06F 15/20
[52] U.S. Cl. .................... 364/431.05; 73/116; 123/416; 324/380; 324/391; 364/431.03
[58] Field of Search ............... 364/431.03, 431.05, 364/431.12; 235/92 MT, 92 T, 92 CA; 73/116, 119 A; 324/378, 380, 384, 391, 392; 123/406, 416, 417, 427; 377/2, 16, 19, 26, 28

[56] References Cited

U.S. PATENT DOCUMENTS

| | | | |
|---|---|---|---|
| 3,733,472 | 5/1973 | Taisne | 377/28 |
| 3,914,580 | 10/1975 | Watson et al. | 235/92 T |
| 3,939,397 | 2/1976 | Maisonville | 324/392 |
| 4,079,234 | 3/1978 | Kashio | 235/92 CA |
| 4,158,129 | 6/1979 | Baumgartner | 377/26 |
| 4,177,516 | 12/1979 | Mason | 364/431.03 |
| 4,201,159 | 5/1980 | Kawai et al. | 364/431.05 |
| 4,210,111 | 7/1980 | Hattori et al. | 123/416 |
| 4,266,518 | 5/1981 | Nishida et al. | 123/416 |
| 4,292,941 | 10/1981 | Suzuki | 123/416 |
| 4,329,959 | 5/1982 | Javeri | 123/416 |

*Primary Examiner*—Errol A. Krass
*Attorney, Agent, or Firm*—Martin A. Farber

[57] ABSTRACT

A system for electronically detecting the transient state of engine operation of an internal combustion engine having a spark ignition system. A measuring circuit counts pulses having the pulse separation of the ignition timing of the spark ignition system and produces data output. A plurality of memorizing circuits are provided for memorizing old data output from the measuring circuit and a subtractor compares the old data output and the memorizing circuit with the new data output from the measuring circuit and produces the difference between the data and the amount of the difference. The output of the subtractor is used for correcting the air-fuel ratio of the air-fuel mixture of an emission control system using a three-way catalytic converter.

5 Claims, 4 Drawing Figures

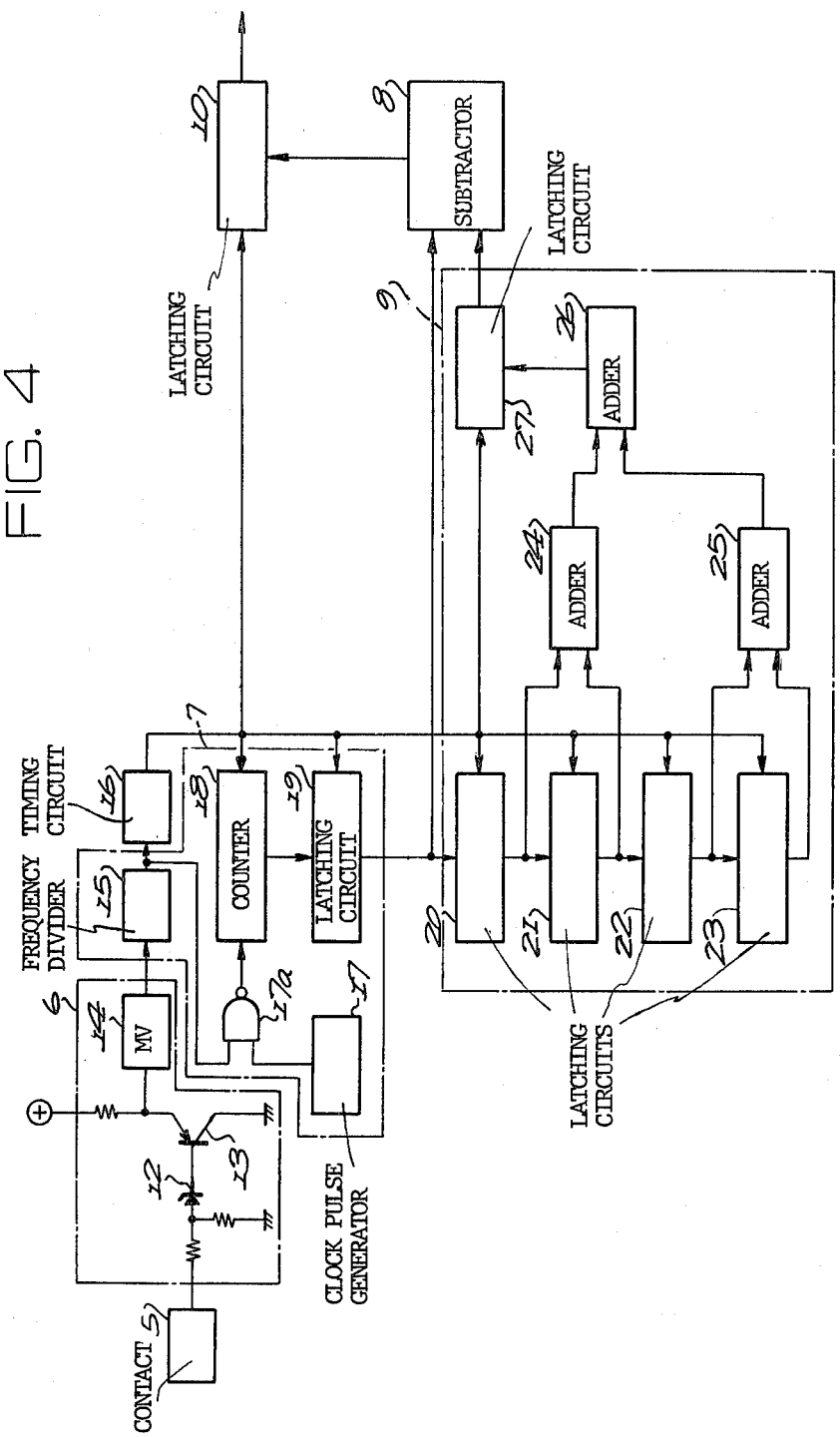

SYSTEM FOR DETECTING THE TRANSIENT STATE OF ENGINE OPERATION

BACKGROUND OF THE INVENTION

The present invention relates to a system for detecting the transient condition of an internal combustion engine for an emission control system with a catalytic converter comprising a three-way catalyst.

Such an emission control system is a feedback control system, in which the system comprises an $O_2$ sensor for detecting the concentration of oxygen in the exhaust gases, an air-fuel mixture supply unit, and an electromagnetic valve for correcting the air-fuel ratio of the air-fuel mixture supplied by the air-fuel mixture supply unit, and an electronic control circuit. The electronic control circuit comprises a comparator for comparing the output signal of the $O_2$ sensor with a predetermined value, a proportional and integrating circuit which is connected to the comparator for integrating the output of the comparator, and a driving circuit connected to the integrating circuit for producing a driving signal for driving the electromagnetic valve. The $O_2$ sensor generates an electrical signal as an indication of the air-fuel ratio of the air-fuel mixture induced in the engine cylinder.

The output voltage of the $O_2$ sensor is higher than a predetermined voltage when the oxygen concentration of the exhaust gases is smaller than a predetermined ratio corresponding to the stoichiometric air-fuel ratio in the air-fuel mixture for the combustion of the mixture and is lower than the predetermined voltage when the oxygen concentration is greater than the predetermined ratio. The control system operates to actuate the electromagnetic valve to correct the air-fuel ratio of the mixture to be supplied to the cylinder of the engine to the stoichiometric air-fuel ratio in dependency upon the output voltage of the $O_2$ sensor.

In such a control system, when the engine is rapidly accelerated, the control is delayed. As a result, the air-fuel ratio of the mixture deviates from the stoichiometric air-fuel ratio to the lean side. Therefore, it is necessary to provide a detecting device for detecting the transient state of the engine, such as acceleration of the engine for producing a detected signal, whereupon the air-fuel ratio is controlled.

In one prior art system, a throttle sensor for detecting the operation of the throttle valve or a vacuum sensor for detecting the vacuum pressure in the induction passage is provided. Such mechanical detecting devices are expensive and complicated in construction. Moreover, generally the mechanical detecting device produces an inaccurate detected signal.

SUMMARY OF THE INVENTION

The object of the present invention is to provide a system for detecting the transient state of the engine, which detects variation of the ignition timing according to the variation of the load of the engine, whereby the transient state may be detected.

Other objects and features of the present invention will be apparent from the following description with reference to the accompanying drawings.

BRIEF DESCRIPTION OF THE DRAWINGS

FIG. 4 is a circuit of an example of the circuit of the present invention.

DETAILED DESCRIPTION OF THE PREFERRED EMBODIMENTS

Figure 1:
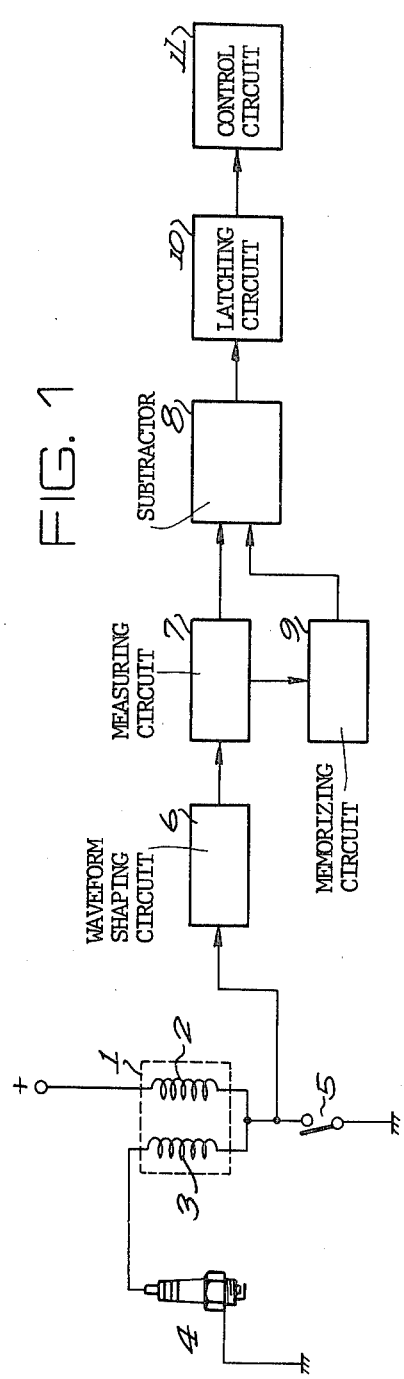
FIG. 1 is a block diagram showing an embodiment of the present invention.

Referring to FIG. 1, an ignition coil 1 comprises a primary coil 2 connected to a battery and secondary coil 3 connected to an ignition plug 4. Both coils are connected to a contact 5 of a distributor. The ignition timing by the contact 5 is changed by a well known timing adjusting device, such as a centrifugal advance or vacuum advance in accordance with the load of the engine. The ignition coil 1 is connected to a pulse separation measuring circuit 7 through a waveform shaping circuit 6. The measuring circuit 7 is connected to a subtractor 8 and a pulse separation memorizing circuit 9 which is in turn connected to the subtractor 8. The subtractor 8 is connected to a measured data latching circuit 10. The output of the data latching circuit 10 is applied to a feedback control circuit 11 for controlling the air-fuel ratio.

Figure 2:
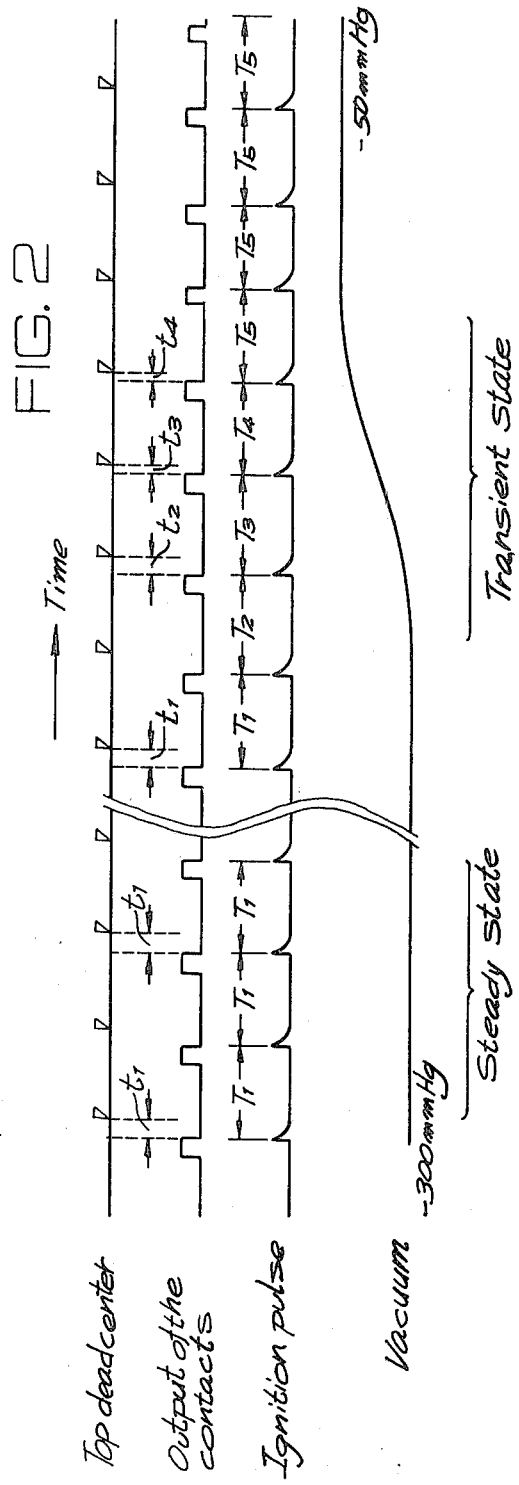
FIG. 2 is a graph with waveforms showing the operation of the system of FIG. 1.
Figure 3:
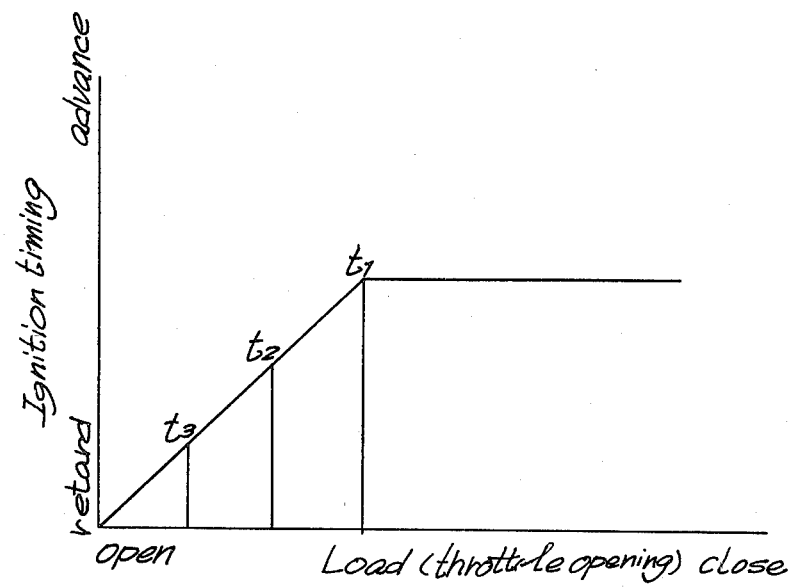
FIG. 3 is a graph showing a relation between the load of the engine and the ignition timing.

Referring to FIG. 2 showing relations between the top dead center of the engine and the pulse separation and the load of the engine, in the steady state of the engine operation, the pulse generated by the contact 5 has a timing $t_1$ in advance of the top dead center. The ignition pulse which responds to a trailing down-going edge of the pulse of the contact 5 is generated with a constant pulse separation $T_1$. When the engine is accelerated, the ignition timing is immediately delayed by the ignition adjusting device in accordance with the increase of the load of the engine from the timing $t_1$ to timing $t_2$. FIG. 3 shows the relation between the ignition timing and the load of the engine. As the load of the engine increases, the timing $t_1$ decreases to $t_2, t_3, t_4 \ldots$ On the other hand, the pulse separation is increased from $T_1$ to $T_2$ by the delay of the timing $t_2$. However, as the engine speed increases, the ignition pulse separation is decreased. Thus, the pulse separation varies in such a manner as $T_2 > T_3 > T_1 > T_4 > T_5$. The present invention detects the variation of the pulse separation.

Referring to FIG. 4, the waveform shaping circuit 6 comprises a Zener diode 12, transistor 13 and a monostble multivibrator 14. The measuring circuit 7 comprises a ½ frequency divider 15 connected to the monstable multivibrator, to a timing circuit 16 and to an input of a NAND gate 17a, and a clock pulse generator 17 connected to another input of the NAND gate 17a which in turn is connected to an 8-bit counter 18 which is connected to an 8-bit latching circuit 19. The 8-bit counter 18 counts clock pulses included in the pulse separation $T_1$. The 8-bit counter 18 and the latching circuit 19 operate in synchronism with the timing pulses from the timing circuit 16 to produce outputs, respectively. The measured data of the counter 18 is latched in the latching circuit 19. The output data of the latching circuit 19 is fed to the subtractor 8 and to the memorizing circuit 9 in synchronism with the timing pulses. The input data signal of the memorizing circuit 9 is sequentially shifted through series connected 8-bit latching circuits 20, 21, 22 and 23. Output data of the latching circuits 20 and 21 are added by an 8-bit adder 24 and the output data of the latching circuits 22 and 23 are added by an 8-bit adder 25. The output data of the 8-bit adders 24 and 25 are added by 9-bit adder 26 and divided by 4 in order to generate a mean value. Thus, the mean value of four data signals latched in the latching circuits 20 to 23 by four timing pulses from the timing circuit 16 is obtained by the 9-bit adder 26. The mean value is latched in an 8-bit latching circuit 27. The new data in the 8-bit latching circuit 19 and the old data in the 8-bit latching circuit 27 are fed to the subtractor 8, so that the difference between both data is produced from the subtractor 8. Thus, the pulse separations $T_1$, $T_2$ $T_3$ $T_4$... are compared with each other, so that the acceleration state and the amount of the acceleration may be detected.

The output of the subtractor 8 is fed to the feedback control circuit 11 via the data latching circuit 8 for correcting the operation of the control circuit, so that the air-fuel ratio may be corrected to a proper value.

From the foregoing, it will be understood that the present invention provides a system which accurately detects the transient state of the engine operation by a simple electronic system.

What is claimed is:

1. A system for detecting a transient state of engine operation of an internal combustion engine having a spark ignition system and an air-fuel ratio control system, comprising
    a waveform shaping circuit means for producing an output pulse train dependent on an ignition pulse train of said spark ignition system,
    a measuring circuit means for measuring each pulse separation of said output pulse train and for producing a corresponding data output and for producing timing pulses for synchronizing operations of component circuits of the system,
    a memorizing circuit means, including circuit means for producing a mean value of at least two sequential of most recent old said data outputs, for memorizing said mean value of said old data outputs, and
    a subtractor means for producing a subtraction output dependent on a difference between said mean value of said old data outputs from said memorizing circuit means and a new said data output from said measuring circuit means thereby detecting the transient state and operatively connected to the air-fuel ratio control system to supply the subtraction output to the air-fuel ratio control system for the control thereof.

2. The system according to claim 1 further comprising
    a latching circuit means for latching the subtraction output of said subtractor means, said latching circuit means being connected to said air-fuel ratio control system.

3. The system according to claim 1, wherein said memorizing circuit means comprises:
    at least four latching circuits connected in series with said measuring circuit means; and
    two first adder means for adding the outputs of said latching circuits, and a second adder means connected to said two first adder means for adding the outputs of said two first adder means and for producing said mean value.

4. A system for detecting a transient state of engine operation of an internal combustion engine having a spark ignition system producing an ignition pulse train having a pulse period dependent on engine load and speed, respectively, and an air-fuel ratio control means for controlling the air-fuel ratio of an air-fuel mixture supplied to the engine, comprising
    means for continuously measuring a pulse period corresponding to said ignition pulse train,
    means for continuously memorizing the measured pulse period,
    means for subtracting a presently measured pulse period from at least one most recent previously measured, memorized pulse period so as to detect the transient state by existence of a difference therebetween,
    said air-fuel ratio control means being operatively connected to said subtracting means and for controlling the air-fuel ratio of the air-fuel mixture supplied to said engine dependent on the difference between said presently measured pulse period and said previously measured, memorized pulse period.

5. A method for detecting a transient state of engine operation of an internal combustion engine, and controlling the latter thereupon, with a spark ignition system producing an ignition pulse train with a pulse period dependent on engine load and speed, respectively, and an air-fuel ratio control means for controlling the air-fuel ratio of an air-fuel ratio mixture supplied to the engine, comprising the steps of
    continuously measuring a pulse period corresponding to that of said ignition pulse train,
    continuously memorizing the measured pulse period,
    subtracting a presently measured pulse period from an average of at least two most recent previously measured and memorized pulse periods so as to detect a difference and thereby the transient state,
    controlling the air-fuel ratio of the air-fuel mixture supplied to said engine dependent on said difference.

* * * * *